United States Patent
Harper

(10) Patent No.: US 7,031,933 B2
(45) Date of Patent: Apr. 18, 2006

(54) PROCESS FOR SETTING AND STORING ORDERING PREFERENCES AND PROFILE DATA LOCALLY

(75) Inventor: Mark A. Harper, Middleton, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 744 days.

(21) Appl. No.: 09/823,783

(22) Filed: Mar. 29, 2001

(65) Prior Publication Data

US 2002/0143642 A1 Oct. 3, 2002

(51) Int. Cl.
*G06F 17/60* (2006.01)

(52) U.S. Cl. ................................................ 705/26
(58) Field of Classification Search .......... 705/26, 705/27
See application file for complete search history.

(56) References Cited

U.S. PATENT DOCUMENTS 5,515,268 A * 5/1996 Yoda .......................... 705/26
5,835,817 A * 11/1998 Bullock et al. ............. 399/25
5,960,411 A * 9/1999 Hartman et al. ............ 705/26

(Continued)

FOREIGN PATENT DOCUMENTS

EP 0 715 221 A1 * 6/1996

OTHER PUBLICATIONS

Rath, Douglas "Xerox", Computer Reseller News, n742, pp162, Jun. 23, 1997. Retrieved from Dialog File 15, Acc#: 01442664.*

(Continued)

*Primary Examiner*—Wynn Coggins
*Assistant Examiner*—Naeem Haq

(57) ABSTRACT

An apparatus is provided for locally setting and storing customer preferences. The apparatus includes a personal computer, a computer peripheral device, a reseller web server, and a device manufacturer web server. The personal computer has a web browser and a messaging system. The computer peripheral device has a messaging system communicating with the personal computer. The reseller web server has a messaging system communicating with the personal computer, and configured to capture customer preferences from a customer accessing the reseller web server to order consumables via the computer peripheral device. The device manufacturer web server has a messaging system, communicating with the reseller web server and the computer peripheral device and operative to receive the customer preferences from the reseller web server and forward the customer preferences to the computer peripheral device using the messaging address for the computer peripheral device. A method is also provided.

20 Claims, 3 Drawing Sheets

U.S. PATENT DOCUMENTS

| | | | |
|---|---|---|---|
| 6,065,824 A * | 5/2000 | Bullock et al. | 347/19 |
| 6,141,507 A * | 10/2000 | Sawada | 399/8 |
| 6,233,409 B1 * | 5/2001 | Haines et al. | 399/10 |
| 6,264,301 B1 * | 7/2001 | Helterline et al. | 347/19 |
| 6,271,928 B1 * | 8/2001 | Bullock et al. | 358/1.16 |
| 6,293,144 B1 * | 9/2001 | Froger et al. | 73/304 C |
| 6,295,423 B1 * | 9/2001 | Haines et al. | 399/24 |
| 6,302,527 B1 * | 10/2001 | Walker | 347/50 |
| 6,312,106 B1 * | 11/2001 | Walker | 347/50 |
| 6,333,790 B1 * | 12/2001 | Kageyama | 358/1.15 |
| 6,405,178 B1 * | 6/2002 | Manchala et al. | 705/29 |
| 6,529,692 B1 * | 3/2003 | Haines et al. | 399/27 |
| 6,798,997 B1 * | 9/2004 | Hayward et al. | 399/12 |
| 2002/0042747 A1 * | 4/2002 | Istvan | 705/26 |
| 2002/0072998 A1 * | 6/2002 | Haines et al. | 705/28 |
| 2002/0073148 A1 * | 6/2002 | Haines et al. | 709/204 |
| 2002/0093676 A1 * | 7/2002 | Parry | 358/1.15 |
| 2002/0143642 A1 * | 10/2002 | Harper | 705/26 |
| 2002/0165784 A1 * | 11/2002 | Taggart et al. | 705/26 |

OTHER PUBLICATIONS

Bliss, Jeff, "Xerox eyes printer arena", Computer Reseller News, n741, pp137-138, Jun. 16, 1997. Retrieved from Dialog File: 15, Acc#: 01436555.*

No author, "Xerox Leads the Industry With Fastest-Ever Office Color Printer", Business Wire, Mar. 20, 2001. Retrieved from Dialog File: 16, Acc#: 08439562.*

* cited by examiner

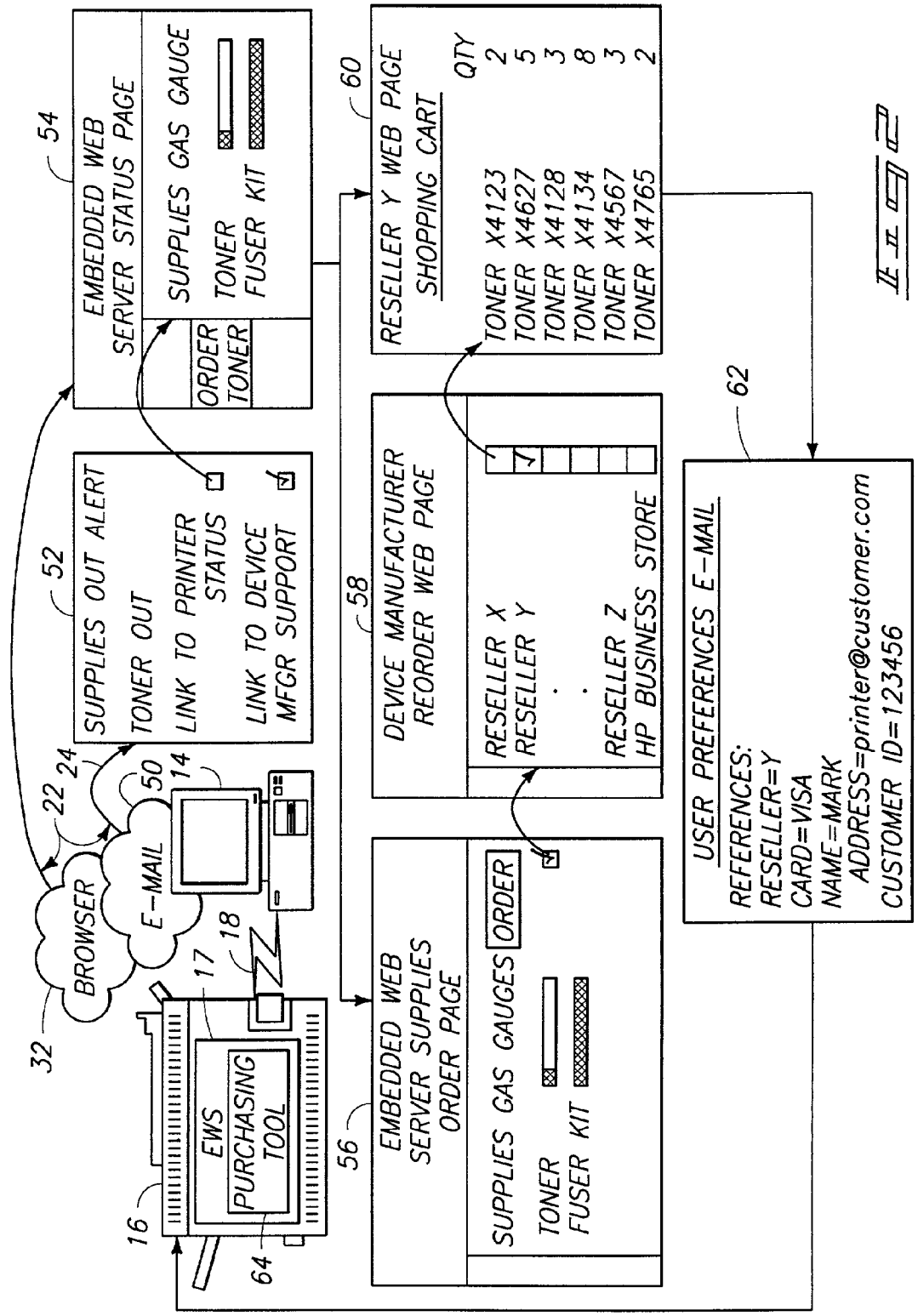

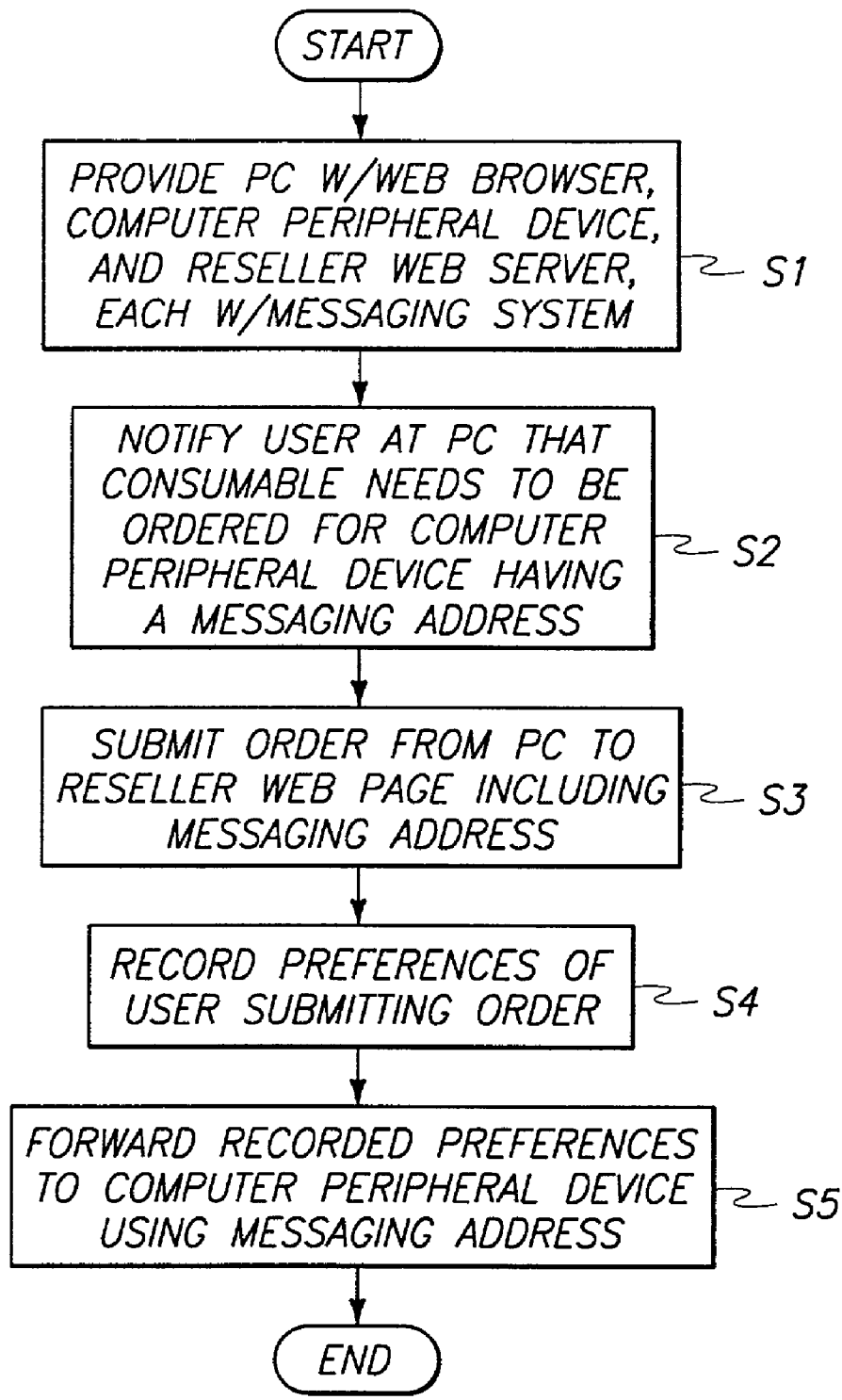

PROCESS FOR SETTING AND STORING ORDERING PREFERENCES AND PROFILE DATA LOCALLY

FIELD OF THE INVENTION

This invention pertains to computers and computer peripheral devices that utilize consumables. More particularly, this invention relates to systems that assist a user that is ordering replacement consumables for a computer peripheral device.

BACKGROUND OF THE INVENTION

As computer systems have gained widespread use, particularly within network environments, the use of computer peripheral devices has increased significantly. Likewise, the utilization of consumables for such computer peripheral devices has also increased significantly. One problem often encountered with any computer system results because consumables are manually ordered by a user either when they run out of a consumable, or when the computer peripheral device or associated personal computer notifies the user that the consumables have been or are about to be depleted.

One such environment comprises a home environment including a personal computer (PC) and a dedicated computer peripheral device such as a printer that is coupled with the PC via a local (or system) bus. Such an environment has been referred to as a single connection environment, and is exclusive of a computer network environment, but may include a connection to an external network such as the Internet. Another environment comprises an unmanaged network environment including a personal computer (PC), an unmanaged network, and a computer peripheral device having an embedded web server. Yet another environment comprises a managed, enterprise network environment including a server, one or more personal computers (PCs), and one or more computer peripheral devices.

The ordering of consumables for computer peripheral devices within any one or more of the above environments has previously been a manual process. For example, consumables are manually ordered by single connection environment users for photo copiers, facsimile machines, printers and multiple function peripheral devices that include more than one of these functional devices. Due to the wide adoption of such devices within these environments, a need exists to be able to more easily and accurately order consumables to replenish depleted consumables. For example, a need exists to assist in ordering of paper, toner, toner supply cartridges, ink, and ink reservoirs. Furthermore, a need exists for a solution that can be readily configured to suit customer needs, and a specific environment.

The ability to enhance ordering of consumables in a manner that provides multiple levels of functionality so as to facilitate use with a number of different environments would greatly increase the user experience and minimize the time and effort needed to maintain consumables and keep computer peripheral components functional. Accordingly, it is desirable to enhance the ease and speed with which consumables are replenished and/or replaced so that adequate supplies of consumables are available for a computer peripheral device when such consumables are sufficiently depleted so as to warrant replenishment.

SUMMARY OF THE INVENTION

A system and method are provided for assisting a user in detecting a need to replenish a consumable. Additionally, the system and method can assist and/or automatically order such consumable for purposes of replenishing the consumable.

According to one aspect, an apparatus is provided for locally setting and storing customer preferences. The apparatus includes a personal computer, a computer peripheral device, a reseller web server, and a device manufacturer web server. The personal computer has a web browser and a messaging system. The computer peripheral device has a messaging system communicating with the personal computer. The reseller web server has a messaging system communicating with the personal computer, and configured to capture customer preferences from a customer accessing the reseller web server to order consumables via the computer peripheral device. The device manufacturer web server has a messaging system, communicating with the reseller web server and the computer peripheral device and operative to receive the customer preferences from the reseller web server and forward the customer preferences to the computer peripheral device using the messaging address for the computer peripheral device.

According to another aspect, a method is provided for locally setting and storing customer preferences. The method includes: providing a personal computer having a web browser, a computer peripheral device, and a reseller web server, each having a messaging system for communicating therebetween; notifying a user at the personal computer that a consumable needs to be ordered for a computer peripheral device having a messaging address; submitting an order from the personal computer to a reseller web page including submitting the messaging address; concurrent with submitting the order, recording preferences of the user submitting the order; and forwarding the recorded preferences to the computer peripheral device using the messaging address.

According to yet another aspect, a method is provided for locally setting and storing customer preferences. The method includes: providing a personal computer having a web browser, a computer peripheral device, a device manufacturer web server, and a reseller web server, each having a messaging system for communicating therebetween; notifying a user at the personal computer that a consumable needs to be ordered for a computer peripheral device having a messaging address; accessing the device manufacturer web server; selecting a reseller from the device manufacturer web server; accessing a reseller web page from the device manufacturer web server; submitting an order from the personal computer to the reseller web page including submitting the messaging address; concurrent with submitting the order, recording preferences of the user submitting the order; and forwarding the recorded preferences to the computer peripheral device using the messaging address.

Other features and advantages of the invention will become apparent to those of ordinary skill in the art upon review of the following detailed description, claims, and drawings.

DESCRIPTION OF THE DRAWINGS

Preferred embodiments of the invention are described below with reference to the following accompanying drawings depicting examples embodying the best mode for practicing the invention.

FIG. 2 is a simplified block diagram showing navigation between web pages in the network environment of FIG. 1

FIG. 3 is a flowchart illustrating process flow steps for locally setting and storing customer preferences.

DETAILED DESCRIPTION OF THE INVENTION

Figure 1:
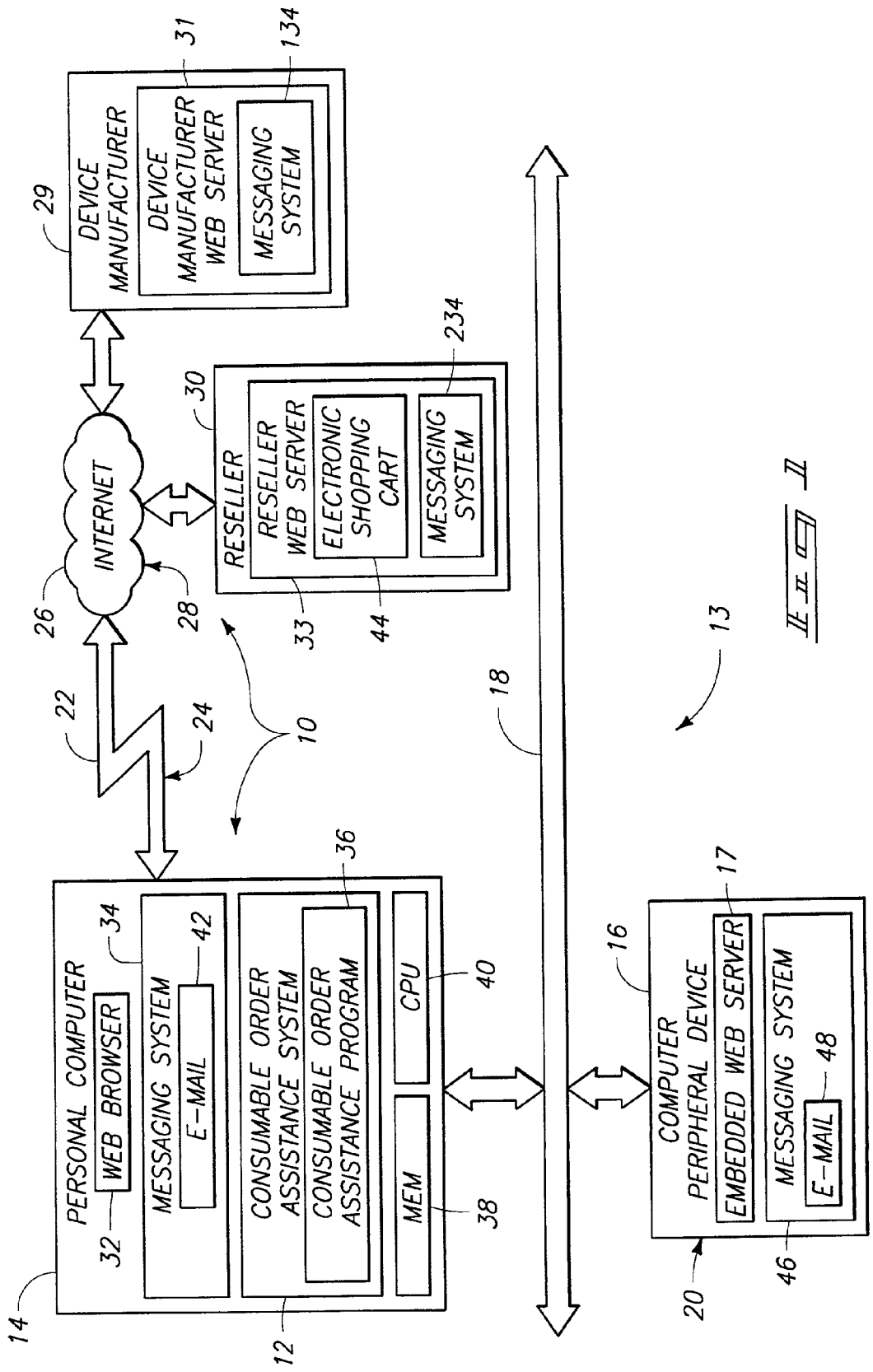
FIG. 1 is a simplified block diagram of an apparatus for setting and storing customer preferences within a consumable order assistance system in a network environment including a personal computer (PC) and one or more computer peripheral devices that are coupled together with a local bus, and wherein the personal computer (PC) includes a communication link with an external network such as the Internet, in accordance with one embodiment of the present invention.

This disclosure of the invention is submitted in furtherance of the constitutional purposes of the U.S. Patent Laws "to promote the progress of science and useful arts". U.S. Constitution, Article 1, Section 8.

Reference will now be made to a preferred embodiment of Applicant's invention. An exemplary implementation is described below and depicted with reference to the drawings comprising an apparatus for locally setting and storing customer preferences. While the invention is described by way of a preferred embodiment, it is understood that the description is not intended to limit the invention to this embodiment, but is intended to cover alternatives, equivalents, and modifications such as are included within the scope of the appended claims.

In an effort to prevent obscuring the invention at hand, only details germane to implementing the invention will be described in great detail, with presently understood peripheral details being incorporated by reference, as needed, as being presently understood in the art.

FIG. 1 is a simplified block diagram of an apparatus for locally setting and storing customer preferences 10. Apparatus 10 is provided within a consumable order assistance system 12 within a network environment 13 including a personal computer (PC) 14 and one or more computer peripheral devices 16 that are coupled together with PC 14 via a bus 18. According to one embodiment, computer peripheral device 16 comprises a printer 20, such as a laser printer. The personal computer (PC) 14 includes a communication link 22, in one form an Internet connection 24, with an external network 26 such as the Internet 28. The Internet 28 connects together a reseller 30 of consumables with PC 14 via communication link 22.

More particularly, PC 14 comprises a web browser 32, a messaging system 34, a consumable order assistance computer program 36, memory 38, and a central processing unit (CPU) 40. Messaging system 34 comprises an e-mail application program 42. Additionally, consumable order assistance computer program 36 cooperates with an electronic shopping cart 44 in a reseller web server 33 of a reseller 30. A messaging system 234, such as an e-mail application, is included within server 33.

As used herein, the term "electronic shopping cart" refers to a piece of software that functions as a catalog and ordering process for an online reseller store. A shopping cart provides an interface between a company's web site and deeper web site infrastructure. More particularly, the electronic shopping cart enables a customer to select merchandise, review selected items, make modifications or additions to an order, and purchase merchandise. Shopping carts are presently commercially available, and are sold as independent pieces of software, wherein companies integrate a shopping cart into a specific online solution. Alternatively, shopping carts can be offered as a feature from a service provider that creates and hosts a company's e-commerce site.

Computer peripheral device 16 also comprises a messaging system 46. Messaging system 46 comprises an e-mail application program 48. E-mail application program 48 is configured to send notifications to a user at PC 14 indicating a need to order a consumable at computer peripheral device 16.

Bus 18 comprises a network connection or network pathway (or channel) extending between multiple devices within a common network. When environment 13 comprises a managed, enterprise network environment, bus 18 comprises an enterprise network connection or pathway extending between multiple devices and servers within one or more interconnected networks.

Consumable order assistance system 12 includes PC 14, at least one peripheral device 16, communication link 24, and consumable order assistance computer program 36. PC 14 includes web browser 32 and messaging system 34 which cooperates with messaging system 46 of peripheral device 16. Communication link 24 signal couples PC 14 with reseller, or seller, 30 of at least one consumable for peripheral device 16 using web browser 32. In operation, consumable order assistance computer peripheral program 36 is configured to receive a notification from peripheral device 16 via messaging system 46 of a need to order a particular consumable, alert a user of PC 14 of notification, and provide an order location to the user for the consumable.

Consumable order assistance computer peripheral program 36 comprises an automatic reorder or reorder assistance program that notifies a customer that consumables need to be ordered for the computer peripheral device. Program 36 also facilitates the order, consolidates the order, and authorizes the order. For consolidation, one maintainer can consolidate consumable ordering for many printers.

In order to facilitate the ordering of consumables, a customer goes through a purchase process once, and thereafter, the order process is recorded and automated. The recorded facilitation process is stored locally, preferably with the automated tools. By storing the information with the automated tools, once initiated by the notification process, the automated tools can use the preferences and profile data to purchase consumables from a desired reseller using appropriate information.

One feature provided by apparatus 10 is the ability to return user (or customer) preferences and customer profile data back to customer tools, such as purchasing tools 64, that are provided in conjunction with an embedded web server on a computer peripheral device, or printer. The preferences and customer profile data can them be used to implement an automated purchase process.

In one case, customer tools comprise purchasing tools 64 such as a program or utility that facilitates a purchase order.

Another feature provided by apparatus 10 is the ability to automate a customer purchase utilizing a device manufacturer web site and web space. More particularly, a device manufacturer web server 31 of device manufacturer 29 can be used to direct a user to a list of resellers, including links or web addresses to reseller web pages. Web server 31 includes a messaging system 134 such as a messaging system provided by an e-mail system that includes an e-mail application.

As shown in FIG. 2, apparatus 10 for setting and storing customer preferences is described in greater detail. A user, or customer, takes a number of steps when implementing a purchasing process for the first time. According to one implementation, the purchaser starts with embedded web server 17 of computer peripheral device 16, wherein embedded web server 17 provides a purchasing tool 64. A customer, using PC 14, receives an e-mail supplies out alert 52 from computer peripheral device 16 via EWS 17, indicating the status of consumable supplies within device 16. For example, alert 52 alerts the consumer that a supply of toner is out (or nearly out) at device 16. A toner level sensor (not shown) is used to detect the level of toner within device 16. Alternatively, the number of printed pages is counted to make an estimate of the amount of toner that has been used.

Preferably, messaging system 46 (see FIG. 1) of device 16 comprises an e-mail application that sends supplies out alert 52 to PC 14 via bus 18, using embedded web server 17. Alert 52 contains a user selectable option to link to device manufacturer support at device manufacturer landing page 56. Additionally, alert 52 contains a user selectable option to link to an embedded web server (EWS) status page 54.

EWS status page 54 comprises a web page that visually displays printer status, and further provides an order toner button that can be used to navigate to a device manufacturer landing page 56 that enables a customer to select a reseller of the consumable (or toner) and navigate to the reseller to order such consumable. More particularly, a customer navigates from EWS status page 54, to device manufacturer landing page 56, to a reseller selection page 58, and to a reseller shopping cart page 60. During such process, user preferences are recorded by each web page, then passed on to the next web page. Finally, the last web page generates an e-mail 62 that delivers the recorded and collected user preferences back to purchasing tool 64.

To start the recording and collection process, EWS 17 attaches an e-mail address specific to EWS 17 to a data stream such as a common gateway interface (CGI) argument, as EWS launches device manufacturer landing page 56. Landing page 56 comprises an embedded web server supplies order page according to one construction. The device manufacturer landing page retrieves the CGI argument from EWS 17 along with ordering information that the user (or customer) enters. The retrieved CGI argument and ordering information is then attached as preferences and/or order information to the CGI argument, as the landing page 56 launches reseller selection page 58.

A user (or customer) then chooses a reseller from a list of resellers provided on reseller selection page 58. As the user chooses a reseller, reseller shopping cart page 60 is launched. Reseller shopping cart page 60 is configured to gather customer profile data along with customer preferences, and send such data and preferences to the device manufacturer web site where a device manufacturer user preferences e-mail page 62 is generated. The device manufacturer web site (or web server), in turn, sends an e-mail along with an attachment back to EWS 17, using the e-mail address for EWS 17. Such e-mail and attachment sets user preferences for a next consumable supplies purchase. Optionally, a set of e-mail commands are sent back to EWS 17 via page 62.

According to one implementation, supplies out alert 52 can be configured to trigger the automatic reorder of consumable supplies for device 16. More particularly, purchasing tool 64 can be configured as an automated ordering tool that retrieves the preferences received from e-mail 62 and launches an automated order process, thereby bypassing a manual consumable supplies ordering process.

Applicant's invention provides one benefit in that e-mail is capable of passing cleanly through firewalls between networks. Thus, such e-mail provides an effective feedback loop that extends through a customer's firewall. Another benefit is provided in that customer data is capable of being delivered to a device manufacturer web server where such data can be provided to track the manner in which consumables and supplies are used by customers in a real-world environment. Yet another benefit is provided in that the e-mail feedback loop can be configured to automatically order so as to provide an automatic consumable ordering feedback control loop via an e-mail feedback mechanism.

FIG. 3 forms a process flow diagram showing the logic processing for setting and storing ordering preferences locally within an embedded web server of a computer peripheral device.

In Step "S1", a personal computer, a computer peripheral device, and a reseller web server are provided. The personal computer has a web browser. Each device includes a messaging system for communicating therebetween. After performing Step "S1", the process proceeds to Step "S2".

In Step "S2", the apparatus notifies a user at the personal computer that a consumable needs to be ordered for a computer peripheral device having a messaging address. After performing Step "S2", the process proceeds to Step "S3".

In Step "S3", the apparatus submits an order from the personal computer to a reseller web page including submitting the messaging address. After performing Step "S3", the process proceeds to Step "S4".

In Step "S4", the apparatus, concurrent with submitting the order, records preferences of the user submitting the order. After performing Step "S4", the process proceeds to Step "S5".

In Step "S5", the apparatus forwards the recorded preferences to the computer peripheral device using the messaging address. After performing Step "S5", the process terminates.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An apparatus for locally setting and storing customer preferences, comprising:
   a personal computer having a web browser and a messaging system;
   a computer peripheral device having an embedded web server with a messaging system communicating with the personal computer;
   a reseller web server having a messaging system communicating with the personal computer, configured to capture customer preferences from a customer accessing the reseller web server to order consumables via the computer peripheral device; and
   a device manufacturer web server having a messaging system, communicating with the reseller web server and the computer peripheral device, by way of the personal computer and the messaging system, and operative to receive the customer preferences from the reseller web server and forward the customer preferences to the computer peripheral device via the personal computer using a messaging address for the computer peripheral device.

2. The apparatus of claim 1 further comprising a network interconnecting the personal computer and the computer peripheral device.

3. The apparatus of claim 1 further comprising a communication link interconnecting the personal computer, the reseller web server, the device manufacturer web server, and the computer peripheral device.

4. The apparatus of claim 1 wherein the customer preferences are forwarded to the computer peripheral device, and wherein the embedded web server forwards the customer preferences to the web browser of the personal computer via the messaging system.

5. The apparatus of claim 4 wherein the web browser generates a consumable order message incorporating the customer preferences and forwards the consumable order message and customer preferences to a reseller to order a consumable that matches the customer preference.

6. The apparatus of claim 5 wherein the web browser automatically generates the consumable order message in response to the computer peripheral device detecting a need to replenish a consumable and forwarding a notification to the personal computer indicating the need to replenish the consumable.

7. The apparatus of claim 1 further comprising a device manufacturer web page provided on the device manufacturer web server and communicating with the personal computer and the reseller web server, and operative to provide a link to the reseller web server, wherein selection of the link to the reseller web server comprises another customer preference that is forwarded to the reseller web page, the device manufacturer web page, and the computer peripheral device.

8. The apparatus of claim 1, wherein the web browser of the personal computer links with the embedded web server of the computer peripheral device to receive status information for consumable supplies on the computer peripheral device.

9. The apparatus of claim 1 wherein the messaging system of the computer peripheral device forwards a customer e-mail address to the device manufacturer web server along with customer preferences.

10. The apparatus of claim 1 wherein the customer preferences comprises consumable order information, and wherein the reseller web server is configured to capture consumable order information.

11. The apparatus of claim 1 wherein the reseller web server is further configured to capture customer profile data.

12. A method for locally setting and storing customer preferences, comprising:
providing a personal computer having a web browser, a computer peripheral device with an embedded web server and a messaging system, and a reseller web server, each having a messaging system for communicating therebetween;
notifying a user at the personal computer that a consumable needs to be ordered for a computer peripheral device having a messaging address;
submitting an order from the personal computer to a reseller web page including submitting the messaging address;
concurrent with submitting the order, recording preferences of the user submitting the order; and
forwarding the recorded preferences to the computer peripheral device using the messaging address.

13. The method of claim 12 further comprising providing a device manufacturer web server and forwarding the recorded preferences and the messaging address to a web page for a device manufacturer web server.

14. The method of claim 12 wherein submitting an order comprises first submitting ordering information and the messaging address from the personal computer to a device manufacturer web server indicating that a consumable needs to be ordered for the computer peripheral device at the messaging address, and secondly forwarding the ordering information and the messaging address to the reseller web page.

15. The method of claim 14 wherein the device manufacturer web server comprises a reseller selection page.

16. The method of claim 14 wherein the reseller web page comprises a reseller shopping cart page that is launched from the reseller selection page in response to a user selecting a particular reseller.

17. The method of claim 16 wherein the device manufacturer web server comprises a device manufacturer landing page, and wherein a data stream from the messaging system and ordering information entered by a user are attached as preferences and order information to the data stream.

18. The method of claim 12 wherein the reseller web page comprises a reseller shopping cart page, wherein the reseller shopping cart page gathers customer profile data with preferences and forwards the customer profile data with preferences to a device manufacturer web server, and wherein the device manufacturer web server generates and forwards a message comprising an e-mail to the messaging system of the embedded web server for the computer peripheral device using the messaging address, wherein the e-mail comprises customer profile data including preferences.

19. A method for locally setting and storing customer preferences, comprising:
providing a personal computer having a web browser, a computer peripheral device having an embedded web server with a messaging system, a device manufacturer web server, and a reseller web server, each having a messaging system for communicating therebetween;
notifying a user at the personal computer that a consumable needs to be ordered for a computer peripheral device having a messaging address;
accessing the device manufacturer web server;
selecting a reseller from the device manufacturer web server;
accessing a reseller web page from the device manufacturer web server;
submitting an order from the personal computer to the reseller web page including submitting the messaging address;
concurrent with submitting the order, recording preferences of the user submitting the order; and
forwarding the recorded preferences to the computer peripheral device using the messaging address.

20. The method of claim 19 wherein the device manufacturer web server comprises a reseller selection web page.

* * * * *